US008527648B2

(12) United States Patent
Liu et al.

(10) Patent No.: US 8,527,648 B2
(45) Date of Patent: Sep. 3, 2013

(54) SYSTEMS, METHODS, AND COMPUTER PROGRAM PRODUCTS FOR OPTIMIZING CONTENT DISTRIBUTION IN DATA NETWORKS

(75) Inventors: Yali Liu, Pleasanton, CA (US); Mung Chiang, Princeton, NJ (US); Raghvendra Savoor, Walnut Creek, CA (US); Bruce Alden Schine, San Leandro, CA (US); Michael Tisiker, Westland, MI (US); Yongdong Zhao, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 319 days.

(21) Appl. No.: 12/906,442

(22) Filed: Oct. 18, 2010

(65) Prior Publication Data

US 2012/0093054 A1    Apr. 19, 2012

(51) Int. Cl.
*H04L 29/14* (2006.01)
*H04L 29/06* (2006.01)

(52) U.S. Cl.
CPC ............................. *H04L 29/06455* (2013.01)

USPC ........................................... 709/231; 725/114

(58) Field of Classification Search
CPC ................................................ H04L 29/06455
USPC ........................................ 709/231; 725/114
See application file for complete search history.

(56) References Cited

U.S. PATENT DOCUMENTS

| 7,222,185 | B1* | 5/2007 | Day | 709/232 |
|---|---|---|---|---|
| 7,376,198 | B2* | 5/2008 | Day | 375/295 |
| 7,631,080 | B2* | 12/2009 | Epstein et al. | 709/226 |
| 2002/0087797 | A1* | 7/2002 | Adrangi | 711/133 |
| 2007/0162502 | A1* | 7/2007 | Thomas et al. | 707/104.1 |
| 2009/0081944 | A1* | 3/2009 | Yavuz et al. | 455/3.01 |
| 2009/0168752 | A1* | 7/2009 | Segel | 370/351 |

* cited by examiner

*Primary Examiner* — Kibrom T Hailu
*Assistant Examiner* — Benjamin Lamont
(74) *Attorney, Agent, or Firm* — Parks IP Law LLC; Mickki D. Murray, Esq.

(57) ABSTRACT

Systems, methods, and computer program products are for selecting content for distribution via a data network, and creating at least one content distribution channel to distribute specific content of the selected content. The specific content is partitioned from the selected content based upon a criterion common to the specific content.

18 Claims, 10 Drawing Sheets

SYSTEMS, METHODS, AND COMPUTER PROGRAM PRODUCTS FOR OPTIMIZING CONTENT DISTRIBUTION IN DATA NETWORKS

TECHNICAL FIELD

The embodiments presented herein relate generally to content distribution in data networks and, more particularly, to systems, methods, and computer program products for optimizing content distribution in a data network.

BACKGROUND

Today's Internet service providers (ISPs) include wireless service providers that provide wireless data access service to millions of subscribers. Availability of multimedia-rich applications such as Internet browsing access, video and audio streaming, news, social networking, and persistent context-aware applications is rapidly increasing, while the number and diversity of wireless devices capable of high-speed data network access and multimedia playback are concurrently increasing towards a future in which most, if not all, wireless devices will have multimedia and data access capabilities.

It is estimated that from 2008 through 2013, global media traffic will increase by approximately 66 times. In particular, video traffic is expected to grow at an annual rate of around 154%. This trend is further amplified by diversification of networks such as femtocell-based networks, of devices like netbook computers, and tablets such as Apple® iPad (available from Apple Corporation of Cupertino, Calif.), and of applications such as video social networking. This migration to more data-intensive applications presents new challenges for mobile operators to cost effectively provide high-quality media content to their subscribers while also minimizing bandwidth resource usage by each device.

Content broadcasting techniques present a promising area for conserving bandwidth. Optimizing placement and management of content to be distributed through a broadcast mechanism remains an allusive goal for the conservation of bandwidth and for providing a robust, high-speed data access network for wireless service subscribers.

SUMMARY

According to one exemplary embodiment, a method for optimizing distribution of content via a wireless data network includes selecting content for distribution via the wireless network, and creating one or more content distribution channels, each of the content distribution channels being configured to distribute specific content of the selected content, the specific content being partitioned from the selected content based upon a criterion common to the specific content for the channel.

In one embodiment, the selection of content for distribution via the wireless network is based upon one or more factor including (I) a popularity factor identifying a number of unique requests for the selected content over a time period, (II) a volume factor identifying a number of bytes of the selected content, (III) a time sensitivity factor identifying a tolerable time delay for distribution of the selected content, and (IV) a synchronism factor identifying a variance among users in terms of when each of the users requests the selected content.

In one embodiment, the method for optimizing distribution of content via the wireless data network further includes calculating a value for a multicast/broadcast-ability factor, wherein the multicast/broadcast-ability factor is a combination of (I) the popularity factor, (II) the volume factor, (III) the time sensitivity factor, and (IV) the synchronism factor. In this embodiment, the method further includes determining whether the value for the multicast/broadcast-ability factor is greater than or equal to a threshold value. Moreover, in this embodiment, selection of the content for distribution via the wireless data network is contingent upon the value for the multicast/broadcast-ability factor being determined as greater than or equal to the threshold value. In one embodiment, the multicast/broadcast-ability factor is in a unit of $kUser*MB/sec^2$.

In one embodiment, the popularity factor, the volume factor, the time sensitivity factor, and the synchronism factor are each calculated based upon measurements collected from one or more network nodes of the wireless data network.

In one embodiment, the method for optimizing distribution of content via the wireless data network further includes determining a distribution assignment for each of the content distribution channels, the distribution assignment assigning the content distribution channel to one or more of a plurality of distribution centers.

In one embodiment, the method for optimizing distribution of content via the wireless data network further includes creating a personal profile for a user of the wireless data network based upon one or more of subscriber information, subscriber behavior, and subscriber transaction history.

In one embodiment, the method for optimizing distribution of content via the wireless data network further includes recommending one or more of the content distribution channels to the user. Moreover, in some embodiments, the method further includes determining whether the user accessed one or more of the recommended content distribution channels after the recommendation, and optimizing distribution assignment of each of the content distribution channels to one or more of a plurality of distribution centers based upon the determination of whether the user accesses at least one of the recommended content distribution channels after the recommendation.

According to another exemplary embodiment, a content controller includes an input/output (I/O) component, a processor in communication with the (I/O) component, and a memory in communication with the processor. The memory includes computer-executable instructions that, when executed by the processor, cause the processor to perform steps of the aforementioned method.

According to yet another exemplary embodiment, a tangible, non-transitory computer-readable medium includes computer-executable instructions that, when executed by a processor, cause the processor to perform steps of the aforementioned method.

DETAILED DESCRIPTION

Figure 1:
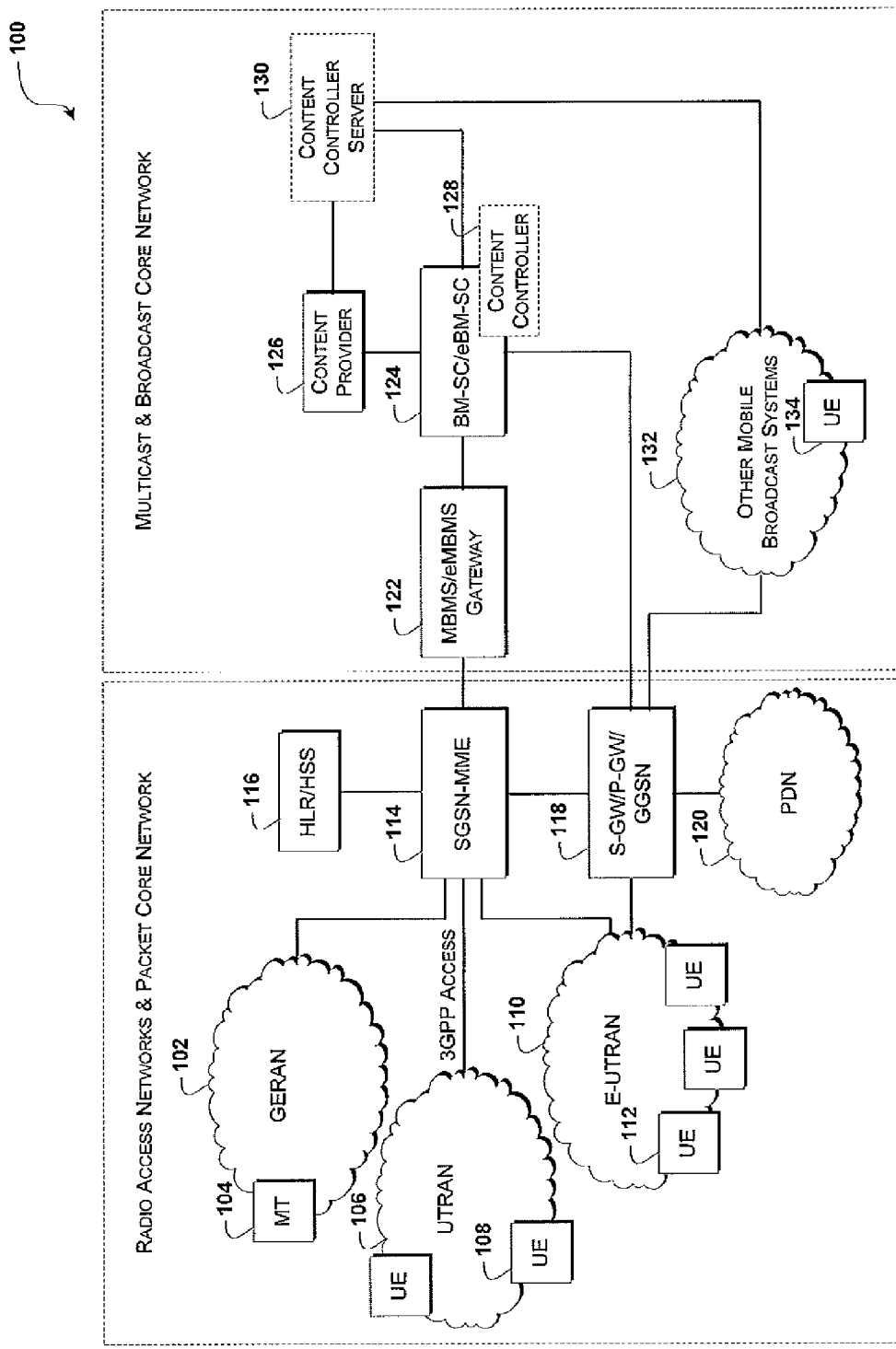
FIG. 1 schematically illustrates an exemplary communications network architecture.

As required, detailed embodiments are disclosed herein. It must be understood that the disclosed embodiments are merely exemplary examples that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials, or methods have not been described in detail in order to avoid obscuring the embodiments disclosed herein. Therefore, specific structural and functional details disclosed herein are not to be interpreted as limiting, but merely as a basis for the claims and as a representative basis for teaching one skilled in the art to variously employ the disclosed embodiments.

While the processes or methods described herein may, at times, be described in a general context of computer-executable instructions, the present methods, procedures, and processes can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network nodes, single or multiple processor computers, hand-held computing devices, mobile devices, microprocessor-based consumer electronics, programmable electronics, network elements, gateways, network functions, devices, combinations thereof, and the like.

The systems, devices, methods, and computer program products described herein may be implemented in wireless networks that use exemplary telecommunications standards, such as Global System for Mobile communications (GSM) and a Universal Mobile Telecommunications System (UMTS). It should be understood, however, alternatively or additionally, the systems, devices, methods, and computer program products may be implemented in wireless networks that use any existing, developing, or yet to be developed telecommunications technologies. Some examples of other suitable telecommunications technologies include, but are not limited to, networks utilizing Time Division Multiple Access (TDMA), Frequency Division Multiple Access (FDMA), Wideband Code Division Multiple Access (WCDMA), CDMA2000, Orthogonal Frequency Division Multiplexing (OFDM), Long Term Evolution (LTE), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family such as High-Speed Downlink Packet Access (HSDPA), Enhanced Uplink (EUL) or otherwise termed High-Speed Uplink Packet Access (HSUPA), Evolved HSPA (HSPA+), and various other current and future data bearers. An exemplary communications network architecture is now described with reference to FIG. 1.

Referring now to the drawings in which like numerals represent like elements throughout the several views, FIG. 1 schematically illustrates an exemplary communications network 100.

Network Architecture—Radio Access Networks and Packet Core Network

The illustrated communications network 100 includes three radio access networks (RANs), although additional or alternative RAN types are contemplated, A first RAN, illustrated in the uppermost left-hand portion of FIG. 1, is a GSM EDGE RAN (GERAN) 102 configured according to 3GPP (Third Generation Partnership Project) standards to facilitate GSM and EDGE radio access to one or more GSM/EDGE-compatible mobile terminals (MT) 104 including, for example, a hand-held telephone, a computer equipped with an EDGE adapter, or other device configured to communicate via GSM EDGE.

A second RAN, illustrated in the middle left-hand portion of FIG. 1, is a UMTS terrestrial RAN (UTRAN) 106 configured according to 3GPP standards to facilitate UMTS/HSPA radio access via to one or more UMTS compatible user equipment (UE) 108 including, for example, a hand-held telephone, a computer equipped with a mobile broadband adapter, or other device configured to communicate via UMTS.

The third RAN, illustrated in the lowermost left-hand portion of FIG. 1, is an evolved UTRAN (E-UTRAN) 110 configured according to 3GPP standards to facilitate LTE radio access to one or more LTE-compatible user equipment 112 including, for example, a hand-held telephone, a computer equipped with a mobile broadband adapter, or other device configured to communicate via LTE.

Each of the illustrated RANs 102, 106, 110 is in communication with a combined serving GPRS support node (SGSN)-mobility management entity (MME) 114. Although illustrated as a combined network node, the SGSN-MME 114 may, in alternative configurations, be embodied as distinct nodes in the communications network 100; in which case, for example, the GERAN 102 and UTRAN 106 would communicate with the SGSN and the E-UTRAN would communicate with the MME. The SGSN-MME 114 provides packet-data switching and mobility session management for 3GPP technologies such as provided via the GSM, UMTS, and LTE RANs in the communications network 100. In particular, the SGSN-MME 114 records and tracks the location of each device (e.g., the MT 104 and the UEs 108, 112; collectively referred to herein, at times, as mobile communications devices 104, 108, 112) in the communications network 100. The SGSN-MME 114 also provides security and access control functions. Moreover, while only one SGSN-MME is illustrated, multiple SGSN-MMEs or disparate SGSN and MME nodes may be deployed in the communications network 100 according to the needs of the network operator.

The SGSN-MME 114 is in communication with a home location register (HLR)/home subscriber server (HSS) 116. Although illustrated as a combined subscriber database management solution, the HLR/HSS may, in alternative configurations, be embodied as distinct nodes in the communications network 100. While only one HLR/HSS 116 is illustrated, multiple HLR/HSSs or disparate HLR and HSS nodes may be deployed in the communications network 100 according to the needs of the network operator.

The HLR/HSS 116 provides a centralized subscriber database management solution for the 3GPP technologies used by the communications network 100. In particular, the HLR/HSS 116 is configured to provide routing information for mobile-terminated calls and various messaging communications such as Short Message Service (SMS). The HLR/HSS 116 is also configured to maintain subscriber data that is distributed to the relevant visiting location register (VLR) (not illustrated) or the SGSN-MME 114 through an attach process and to provide mobility management procedures such as location area and routing area updates. The HLR/HSS 116 may be logically associated with an Authentication Center (AuC) (not illustrated) that is configured to authenticate each subscriber identity module (SIM), universal SIM (USIM), or universal integrated circuit card (UICC) of the mobile communications devices 104, 108, 112. These modules/circuit cards contain subscriber information to enable network access to one or more of the RANs 102, 106, 110 in the communications network 100.

The SGSN-MME 114 is also in communication with a combined serving gateway (S-GW), packet data network (PDN) gateway (P-GW), and gateway GPRS support node (GGSN) 118. Although illustrated as a combined network node, the S-GW/P-GW/GGSN 118 may, in alternative configurations, be embodied as distinct nodes in the communications network 100. While only one S-GW/P-GW/GGSN 118 illustrated, multiple S-GW/P-GW/GGSNs or disparate S-GWs, P-GWs, and/or GGSNs may be deployed in the communications network 100 according to the needs of the network operator.

The S-GW of the S-GW/P-GW/GGSN 118 provides a terminating interface towards the E-UTRAN 110. The P-GW terminates the interface towards a PDN 120, such as Internet, intranet, and other data network types including operator IP services networks for LTE. The GGSN provides similar functionality for GSM/UMTS-based access to the PDN 120. Although one PDN is illustrates, multiple PDNs are contemplated.

Network Architecture—Multicast and Broadcast Core Network

In addition to providing data and voice services, the communications network 100 provides multicast and/or broadcast services to deliver multimedia content to the mobile communications devices 104, 108, 112. In particular, the illustrated communications network 100 supports Multimedia Broadcast and Multicast Service (MBMS) and evolved MBMS (E-MBMS), as standardized by 3GPP. The communications network 100 may, additionally or alternatively, support broadcast/multicast technologies such as BroadCast and MultiCast Service (BCMCS), as standardized by 3GPP2 for CDMA2000-based networks.

Multicast and broadcast core network components include an MBMS/eMBMS gateway 122 that is in communication with a broadcast and multicast service center (BM-SC) to support MBMS service and an evolved BM-SC (eBM-SC) to support E-MBMS. These service centers are illustrated as a combined node, BM-SC/eBM-SC 124. Although the illustrated configuration may be preferable in certain implementations, the BM-SC and eBM-SC may, alternatively, be distinct nodes in the MBMS core network according to the needs of the network operator.

The BM-SC/eBM-SC 124 provides an interface between one or more content providers including, for example, the illustrated content provider 126 and MBMS/E-MBMS services offered by the communications network 100. The BM-SC/eBM-SC 124 controls the setup and release of transport bearers and the scheduling of MBMS/E-MBMS transmissions. The BM-SC/eBM-SC 124 notifies the S-GW/P-GW/GGSN 118 of the SGSN-MMEs (e.g., the illustrated SGSN-MME 114 and/or one or more additional SGSN-MMEs) required for a particular broadcast or multicast session. The BM-SC/eBM-SC 124 is further configured to provide functionality including, for example, user service discovery and announcement functions, session and transmission functions, and membership functions for multicast bearers as-needed to support MBMS/E-MBMS. Moreover, the BM-SC/eBM-SC 124, in some embodiments, consists of multiple functional entities each being configured to perform one or more of the aforementioned functions for the BM-SC/eBM-SC 124.

The communications network 100 also includes a content controller 128 and a content controller server 130. In the illustrated embodiment, the content controller 128 is associated with the BM-SC/eBM-SC 124. In one embodiment, the content controller 128 is a software module configured to provide additional functionality to the BM-SC/eBM-SC 124 for performing optimization processes including, for example, a channelization process, a localization process, and a personalization process, each of which is described in greater detail below with reference to FIGS. 6-10.

In another embodiment, the content controller 128 includes software and hardware components that are in communication with the BM-SCIeBM-SC 124. The content controller 128, in some embodiments, is configured to add optimization functions to the BM-SC/eBM-SC 124 via software and/or firmware installation or as a hardware/software add-on component. Alternatively, the content controller 128 is built-in to the BM-SC/eBM-SC 124. This specially-configured service center is configured to provide the functions of the BM-SC/eBM-SC 124 and the optimization functions described in further detail herein.

The content controller server 130 is provided as an alternative or complementary solution for optimizing content distribution in the communications network 100. The content controller server 130, in one embodiment, provides the same functionality as the content controller 128 for network configurations in which the content controller 128 is not used. The content controller server 130, in another embodiment, is configured to as a backup to the content controller 128. The content controller server 130 is external to and in communication with the BM-SC/eBM-SC 124 to facilitate optimization of content distribution via MBMS and E-MBMS services. The content controller server 130 may, alternatively or additionally, facilitate optimization of content distribution via broadcast technologies of other mobile broadcast systems 132.

In addition to cellular-based broadcast technologies, the communications network 100 is configured to provide interoperability for the other mobile broadcast systems 132 including, for example, MediaFlo™ (available from Qualcomm of San Diego, Calif.) and Digital Video Broadcasting-Handheld (DVB-H). In one embodiment, the optimization functions performed by the content controller server 130 are technology-specific. For example, the optimization processes performed by the content controller server 130 for MBMS may be different from the optimization processes performed for MediaFlo™. A UE 134 is illustrated as being in communication with the other mobile broadcast systems 132. The UE 134 may be one of the mobile communications devices 104, 108, 112 described above or another device configured to communicate with at least one of the other mobile broadcast systems 132 and, optionally, one or more of the illustrated RANs 102, 106, 110.

It should be understood that while embodiments of the disclosed architecture have been illustrated and described with particular reference to optimizing content distribution in a wireless network, the disclosed aspects may, alternatively or additionally, apply to wireline networks.

Network Architecture—Content Controller For Optimizing Content Distribution

Figure 2:
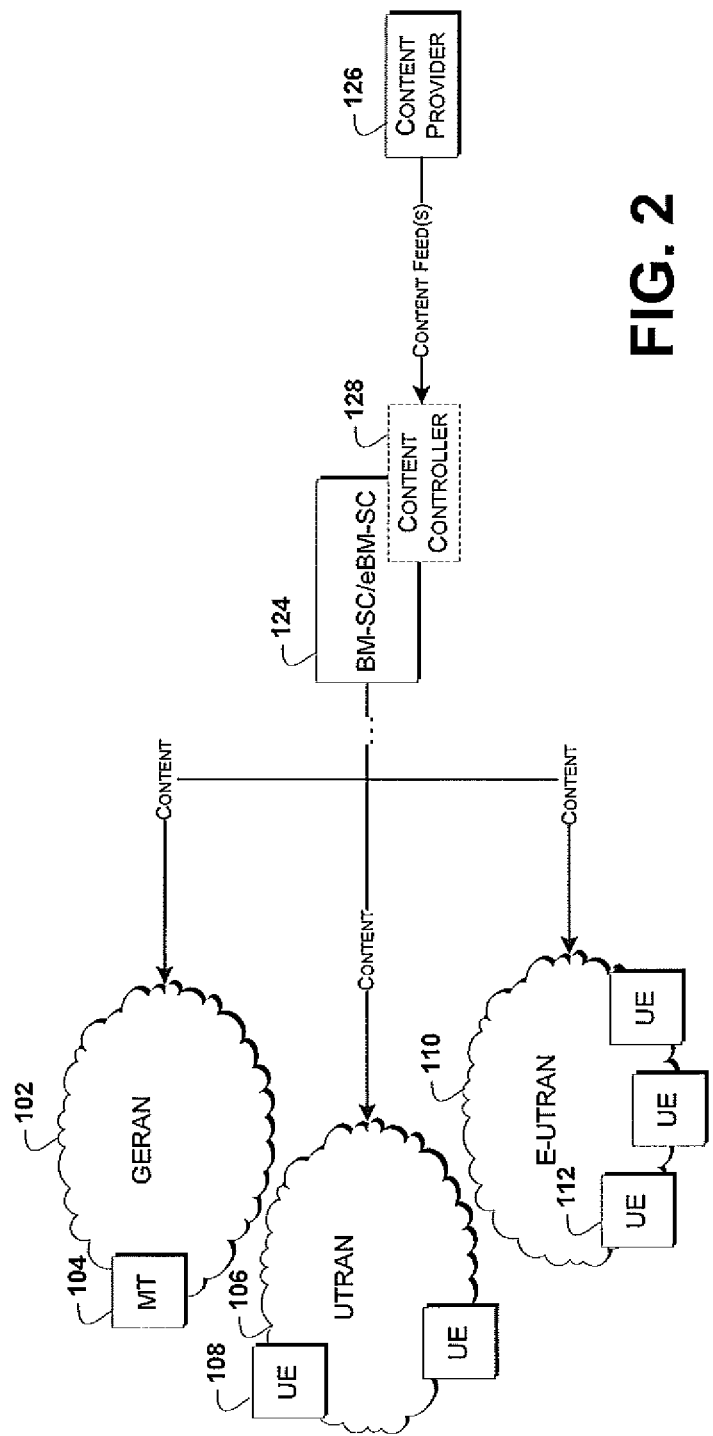
FIG. 2 schematically illustrates an embodiment of the communications network in which content distribution is optimized for broadcast and/or multicast via a broadcast and multicast service center (BMSC) configured with a content controller.

Referring now to FIG. 2, an embodiment is illustrated in which content distribution is optimized for broadcast and/or multicast via the communications network 100 using a BMSC configured with a content controller. In the illustrated embodiment, the content controller 128 receives one or more content feeds from the content provider 126 and/or one or more other content providers (not illustrated). In some embodiments, the content feeds provided by the content provider 126 include one or more of video streams, audio streams, video downloads, audio downloads, news, sports, financial data, Internet browsing traffic, social networking data, software downloads, firmware downloads, software updates, firmware updates, other types of Internet traffic, and combinations thereof.

The content controller 128 performs various optimization processes, such as those described below with reference to FIGS. 6-10, and delivers the content via the BM-SC/eBM-SC 124 through the packet core and to one or more of the mobile communications devices 108, 110, 112.

Figure 3:
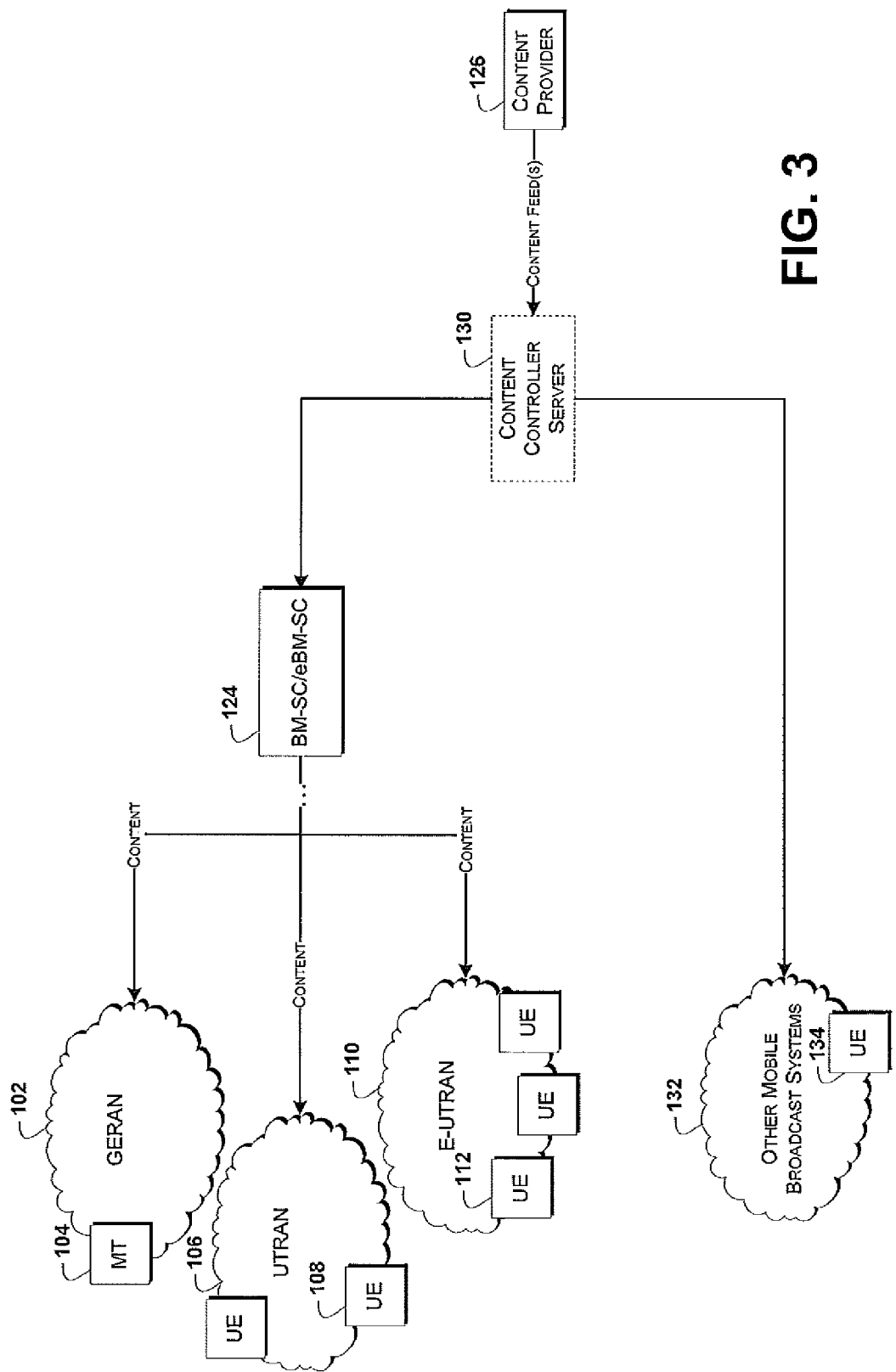
FIG. 3 schematically illustrates an embodiment of the communications network in which content distribution is optimized for broadcast and/or multicast via a content controller server that is in communication with a BMSC and at least one mobile broadcast system.

Network Architecture—Content Controller Server For Optimizing Content Distribution Referring now to FIG. 3, an embodiment is illustrated in which content distribution is optimized for broadcast and/or multicast via the communications network 100 using a content controller server. In the illustrated embodiment, the content controller server 130 performs various optimization processes, such as those described below with reference to FIGS. 6-10, and delivers the content via the BM-SC/eBM-SC 124 through the packet core and to one or more of the mobile communications devices 104, 108, 112. Alternatively or additionally, the content controller server 130 performs the optimization processes and delivers the content to the other mobile broadcast systems 132 for delivery.

Content Controller System

Figure 4:
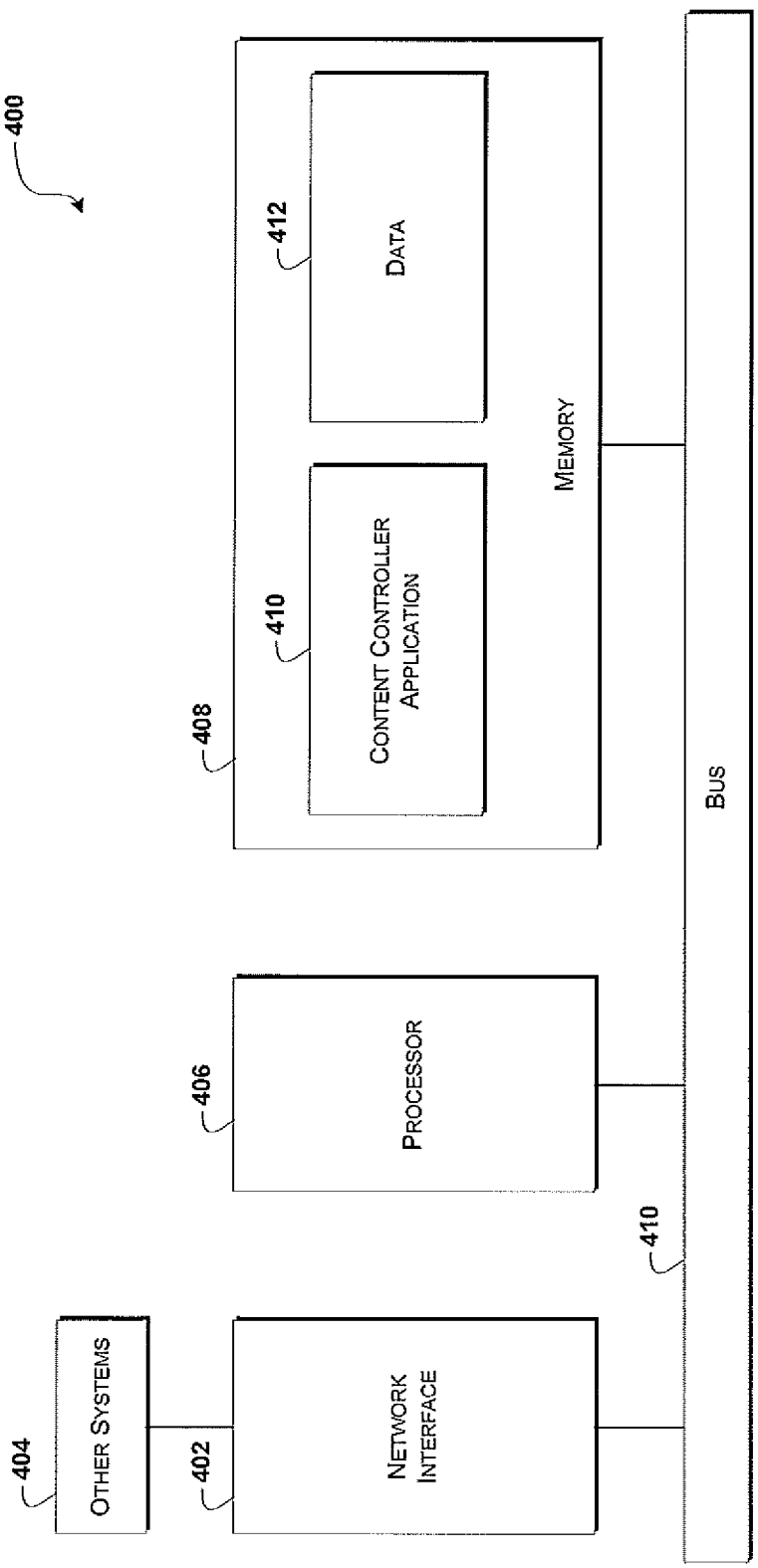
FIG. 4 schematically illustrates an embodiment of a content controller server and components thereof.

Turning now to FIG. 4, an exemplary content controller system 400 and components thereof is illustrated. The content controller system 400, in one embodiment, is the content controller server 130. In another embodiment, the content controller system 400 is the content controller 128 configured as a hardware/software add-on to the BM-SC/eBM-SC 124. In yet another embodiment, the software components of the content controller system 400 are provided as the content controller 128. In still another embodiment, the content controller system 400 is a specially-configured service center configured to provide the functions of the BM-SC/eBM-SC 124 and the optimization functions described below with reference to FIGS. 6-10. Alternatively, the content controller system 400 configured to provide similar service center functions for BCMCS.

Although connections are not shown between all components illustrated in FIG. 4, the components can interact with each other to carry out various system functions described herein. It should be understood that FIG. 4 and the following description are intended to provide a general description of a suitable environment in which the various aspects of some embodiments, such as those described above, can be implemented.

The content controller system 400 includes a network interface 402 for facilitating communications with other systems 404, such as the BM-SC/eBM-SC 124, the content provider 126, the other mobile broadcast systems 132, the S-GW/P-GW/GGSN 118, and other systems or components of the communications network 100.

The content controller system 400 also includes one or more processors 406 that are in communication with one or more memory modules 408 via one or more memory/data busses 410. The processor(s) 406 is configured to execute instructions of a content controller application 410 stored on a tangible, non-transitory computer-readable medium, such as the illustrated memory module(s) 408, to perform optimization processes described herein with reference to FIGS. 6-10.

The term "memory," as used herein to describe the memory module(s) 408, collectively includes all memory types associated with the content controller system 400, such as, but not limited to, processor registers, processor cache, random access memory (RAM), other volatile memory forms, and non-volatile, semi-permanent or permanent memory types; for example, tape-based media, tangible optical media, solid state media, hard disks, combinations thereof, and the like. While the memory module(s) 408 is illustrated as residing proximate the processor(s) 406, it should be understood that the memory module(s) 408 is in some embodiments a remotely accessible storage system, such as a memory of the BM-SC/eBM-SC 124. Moreover, the memory module(s) 208 is intended to encompass network memory and/or other storage devices in wired or wireless communication with the content controller system 400. The memory module(s) 208 may also store other data 412, which may include cached customer information, cell site information, map/location information, charging detail records (CDRs), and the like received from other network nodes for use in performing the optimization processes.

Mobile Device

Figure 5:
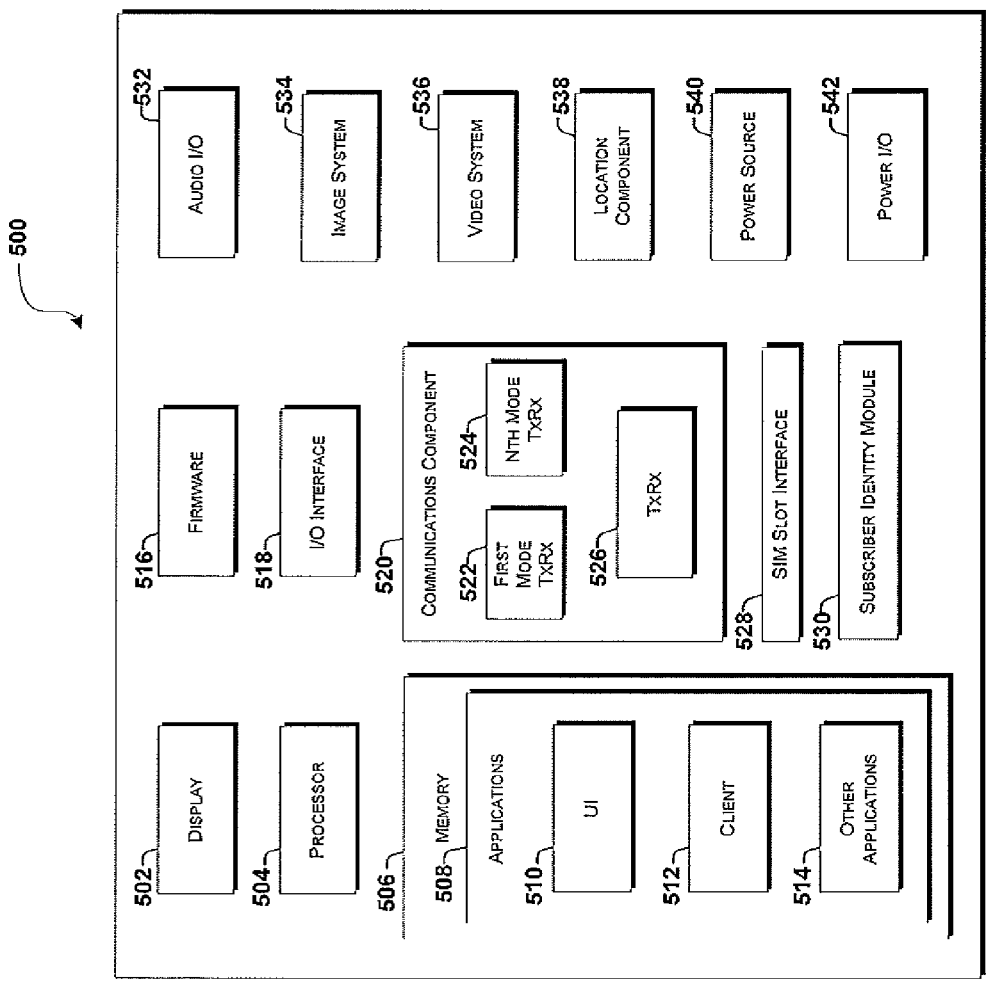
FIG. 5 schematically illustrates an embodiment of a mobile communications device and components thereof.

Referring now to FIG. 5, a schematic block diagram of an exemplary mobile device 500 and components thereof is illustrated. Although connections are not shown between the components illustrated in FIG. 5, the components can interact with each other to carry out device functions. In some embodiments, for example, the components are arranged so as to communicate via one or more busses (not shown). It should be understood that FIG. 5 and the following description are intended to provide a general understanding of a suitable environment in which various aspects of the disclosed embodiments can be implemented.

In some embodiments, the mobile terminal 104 and the UEs 108, 112, illustrated in FIGS. 1-3, are configured like the illustrated mobile device 500, now described. In some embodiments, the mobile device 500 is a multimode headset configured to provide access to more than one network type including, for example, the telecommunications technologies described above and/or other technologies such as Wi-Fi™ and WiMAX™. In some embodiments, the mobile device 500 is configured to receive broadcast content via one or more of the other mobile broadcast systems 132.

In some embodiments, the mobile device 500 includes computer-readable media, including, for example, volatile media, non-volatile media, removable media, and non-removable media. The term "computer-readable media" and variants thereof, as used herein with respect to the mobile device 500, refer to storage media and communication media. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, CD-ROM, DVD, or other optical disk-based storage, magnetic tape, magnetic disk storage or other magnetic storage devices, or any other tangible, non-transitory medium that can be used to store the desired information and that can be accessed by the mobile device 500.

As illustrated in FIG. 5, the mobile device 500 includes a display 502 for presenting multimedia such as, for example, SMS messages, multimedia messaging service (MMS) messages, customer service messages, over-the-air (OTA) messages, unstructured supplementary service data (USSD) messages, voicemail notification messages, application graphical user interfaces (GUIs), text, images, video, telephony functions, such as Caller ID data, setup functions, menus), music, metadata, wallpaper, graphics, Internet content, multicast content, broadcast content, social networking content, game content, device status, preferences settings, map and location data, profile (e.g., vibrate, silent, loud) selection, and the like.

The illustrated mobile device 500 also includes a processor 504 for processing data and/or executing computer-executable instructions of one or more applications 508 stored in a memory 506. In some embodiments, the application(s) 506 include a user interface (UI) application 510. The UI application 510 interfaces with a client 512 (e.g., an operating system (OS)) to facilitate user interaction with device functionality and data. In some embodiments, the client 512 is one of Symbian OS® (Symbian OS is a registered trademark of Symbian Limited, of London, England), Microsoft® Windows® Mobile OS (Microsoft and Windows are registered trademarks of the Microsoft Corporation of Redmond, Wash.), Palm webOS® (Palm WebOS is a registered trademark of the Palm Trademark Holding Company, of Sunnyvale, Calif.), Palm OS® (also a registered trademark of the Palm Trademark Holding Company), RIM® BlackBerry® OS (RIM and Blackberry are registered trademarks of Research In Motion Limited of Waterloo, Ontario, Canada), Apple® iOS (Apple and iPhone are registered trademarks of the Apple Corporation, of Cupertino, Calif.), or Google Android® OS (Android is a registered trademark of Google, Inc., of Mountain View, Calif.). These operating systems are merely exemplary of the operating systems that can be used in accordance with the embodiments disclosed herein. Other operating systems are contemplated.

The UI application 510 aids a user in activating service OTA, if applicable, entering message content, viewing received messages (e.g., MMS messages, SMS messages, USSD messages, OTA messages), answering/initiating calls, entering/deleting data, entering and setting user IDs and passwords for device access, configuring settings, manipulating address book content and/or settings, multimode interaction, interacting with received broadcast/multicast content, interacting with other applications 514, and the like.

In one embodiment, the other applications 514 include one or more applications such as a broadcast application, a multicast application, a video streaming application, a video download application, a streaming audio application, an audio download application, combinations thereof, and the like.

In some embodiments, the other applications 514 include, for example, visual voicemail applications, messaging applications (e.g., SMS, enhanced messaging service (EMS), MMS applications), presence applications, text-to-speech applications, speech-to-text applications, add-ons, plug-ins, email applications, music applications, video applications, camera applications, location service applications (LSAs), power conservation applications, game applications, productivity applications, entertainment applications, enterprise applications, combinations thereof, and the like. The applications 508 are stored in the memory 506 and/or as a firmware 516, and are executed by the processor 504. The firmware 516 may also store code for execution during device power up and power down operations.

The illustrated mobile device 500 also includes an input/output (I/O) interface 518 for input/output of data such as location information, presence status information, user IDs, passwords, and application initiation (start-up) requests. In some embodiments, the I/O interface 518 is a hardwire connection such as a USB, mini-USB, audio jack, PS2, IEEE 1394, serial, parallel, Ethernet (RJ48) port, RJ11 port, and the like. In some embodiments, the I/O interface 518 is a proprietary interface. In some embodiments, the I/O interface 518 accepts other I/O devices such as keyboards, keypads, mice, interface tethers, stylus pens, printers, solid state memory drives, touch screens, multi-touch screens, touch pads, trackballs, joysticks, directional pads, analog control sticks, microphones, remote control devices, monitors, displays (e.g., liquid crystal displays (LCDs), light emitting diode (LED) backlight LCD, and organic LED OLED) combinations thereof, and the like. It should be appreciated that the I/O interface 518 may be used for communications between the mobile device 500 and a network device or local device, instead of, or in addition to, a communications component 520.

The communications component 520 interfaces with the processor 504 to facilitate wired/wireless communications with external systems. Example external systems include, but are not limited to, SMS service centers (SMSCs), intranets, network databases, network storage systems, cellular networks (e.g., the communications network 100 via one or more of the illustrated RANs 102, 106, 110), location servers, presence servers, Voice over Internet Protocol (VoIP) networks, local area networks (LANs), wide area networks (WANs), metropolitan area networks (MANs), personal area networks (PANs), multicast systems, broadcast systems (e.g., the multicast and broadcast core network components described above with reference to FIG. 1) and other networks, network components, and systems described herein. In some embodiments, the external systems are implemented using Wi-Fi™, WiMAX™, combinations and/or improvements thereof, and the like. In some embodiments, the communications component 520 includes a multimode communications subsystem for providing cellular communications via different cellular technologies, such as by the illustrated GSM/EDGE, UMTS, and LTE networks. In some embodiments, for example, a first cellular transceiver 522 operates in one mode, such as, GSM, and an Nth cellular transceiver 524 operates in a different mode, such as UMTS or LTE. While only two cellular transceivers 522, 524 are illustrated, it should be appreciated that a plurality of transceivers can be included. Moreover, a portion of or the entirety of the communications component 520 may be provided as an add-on to the mobile device 500. The add-on may attach or wirelessly communicate with the mobile device 500 via the I/O interface 518 using a standardized or proprietary communication specification.

The illustrated communications component 520 also includes an alternative communications transceiver 526 for use by other communications technologies such as, for example, Wi-Fi™, Wi-Max™, BLUETOOTH, infrared, infrared data association (IRDA), near field communications (NFC), RF, for receiving multicast communications via MBMS, E-MBMS, or other broadcast and multicast mechanisms described above, and/or for receiving broadcast communications via MediaFlo™, DVB-H, or other broadcast mechanisms, and the like. In some embodiments, the communications component 520 also facilitates reception from terrestrial radio networks, digital satellite radio networks, Internet-based radio services networks, combinations thereof, and the like.

The communications component 520 processes data from a network such as, for example, the Internet, an intranet (e.g., business intranet), a home broadband network, a Wi-Fi™ hotspot, and the like, via an Internet service provider (ISP), digital subscriber link (DSL) provider, or broadband provider. In some embodiments, the communications component 520 facilitates the transmission of authentication information from the mobile device 500 to a network for processing in accordance with the methods described herein.

The illustrated mobile device 500 also includes a SIM slot interface 528 for accommodating a SIM 530 such as a SIM card, a universal SIM (USIM) card, or a universal integrated circuit card (UICC) including one or more SIM applications (e.g., ISIM, SIM, USIM, CSIM).

Audio capabilities for the mobile device 500 may be provided by an audio I/O component 532 that includes a speaker for the output of audio signals and a microphone to collect audio signals.

The mobile device 500 may also include an image capture and processing system 534 (image system). Photos may be obtained via an associated image capture subsystem of the image system 534, for example, a charge-coupled device (CCD) or active pixel sensor (APS) camera. The mobile device 500 may also include a video system 536 for capturing, processing, recording, modifying, and/or transmitting video content. Photos and videos obtained using the image system 534 and the video system 536, respectively, may be added as message content to an MMS message and sent to another mobile device.

The illustrated mobile device 500 also includes a location component 538 for sending and/or receiving signals such as, for example, GPS data, assisted GPS (A-GPS) data, Wi-Fi™/Wi-Max™, and/or cellular network triangulation data, combinations thereof, and the like, for determining a location of the mobile device 500. The location component 538 may communicate with the communications component 520 to retrieve triangulation data for determining a location. In some embodiments, the location component 538 interfaces with cellular network nodes, telephone lines, satellites, location transmitters and/or beacons, wireless network transmitters and receivers, for example, Wi-Fi™ hotspots, radio transmitters, combinations thereof, and the like. Using the location component 538, the mobile device 500 obtains, generates, and/or receives data to identify its location, or transmits data used by other devices to determine the location of the mobile device 500.

The illustrated mobile device 500 also includes a power source 540, such as batteries and/or other power subsystem (AC or DC). The power source 540 may interface with an external power system or charging equipment via a power I/O component 542.

Optimization Methods Using Content Controller System

It should be understood that the steps of the following methods are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated methods can be ended at any time. In certain embodiments, some or all steps of this process, and/or substantially equivalent steps can be performed by execution of computer-readable instructions stored or included on a non-transitory computer-readable medium.

Figure 6:
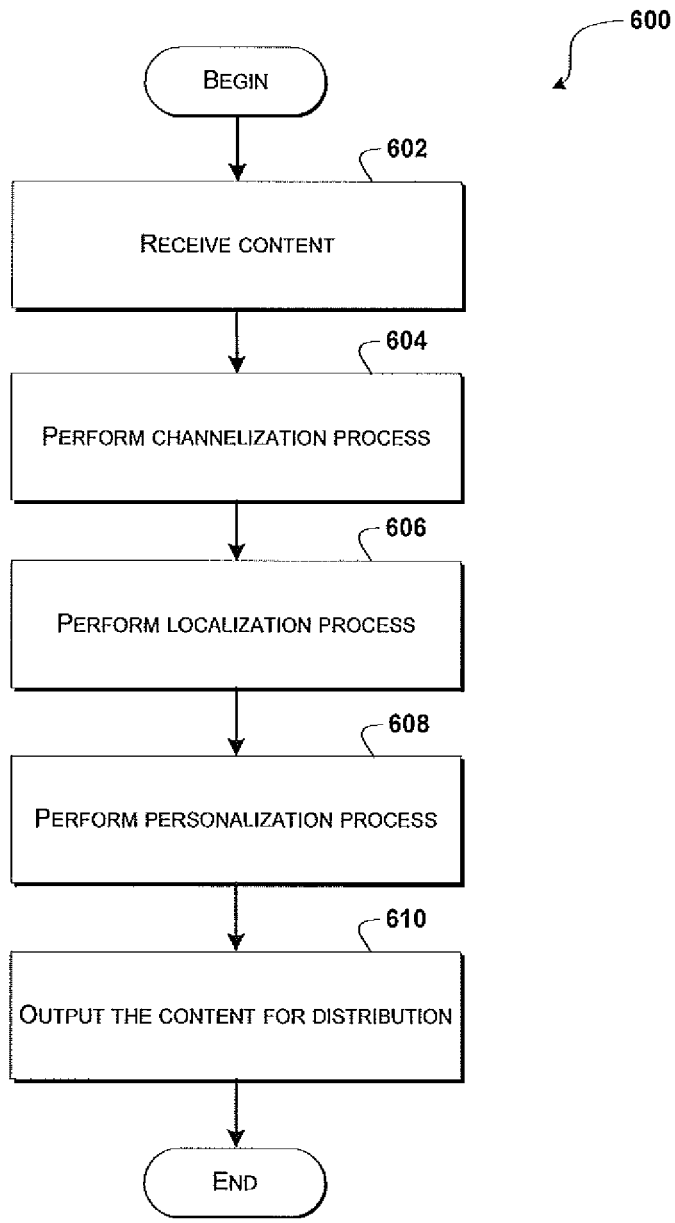
FIG. 6 illustrates an embodiment of a method for optimizing content distribution via a channelization process, a localization process, and a personalization process.

Referring now to FIG. 6, an embodiment of a method 600 for optimizing content distribution via a channelization process, a localization process, and a personalization process is illustrated. The method 600 begins and proceeds to block 602, whereat the content controller system 400, embodied as the content controller 128 and/or the content controller server 130 as described above, receives content from one or more content providers such as the content provider 126.

At step 604, the content controller system 400 performs a channelization process. The channelization process is used to discover and group content together for distribution via one or more content distribution channels for multicast and/or broadcast via any of the aforementioned multicast and broadcast technologies. In one embodiment, the channelization process is based upon four factors, namely (i) a popularity factor, (ii) a volume factor, (iii) a time sensitivity factor, and (iv) a synchronism factor.

The (i) popularity factor is measured as the number of unique requests for content over a period of time. The (ii) volume factor is measured in terms of bytes or multiples thereof such as kilobytes (KB), megabytes (MB), gigabytes (GB), terabytes (TB), or the like. The (iii) time sensitivity factor is measured in seconds. The (iii) time sensitivity factor identifies a tolerable time delay for distribution of the content. The (iv) synchronism factor is measure in seconds. The (iv) synchronism factor identifies a variance among users in terms of a time at which each of the users requests the content.

Content types and/or particular content within a specific content type may have varying values for one or more of the aforementioned channelization factors. For example, finance data (e.g., stock quotes, interest rates, currency exchange rates, and other finance data) tend to have high popularity, high time sensitivity, and high synchronism, but low volume (per piece of financial data). On the other hand, real-time video such as live sporting events and breaking news tend to have high values across all four channelization factors. Other content types, such as software updates, may have a high value for time sensitivity when the software update is critical and low value for time sensitivity when the software update is less critical. Content types that are more particular to certain users, such as email or video uploads to a video sharing website (e.g., YouTube™) may have low time sensitivity, low popularity, and low synchrony. News, sports, and traffic information may have high synchrony and popularity. The above scenarios are merely exemplary of potential channelization factor values for various content types. Actual channelization factor values may vary.

In one embodiment, the (i) popularity factor and the (iv) synchronism factor are used to determine whether a distribution channel should be created for a specific content or group of contents. In this embodiment, the other two channelization factors—(ii) volume and (iii) time sensitivity—are used to determine how much benefit (in terms of estimated bandwidth savings) can be achieved through the channelization process. If the volume value is determined to be too low, such as being determined to be below a specified threshold value, or if the users can wait (i.e., time sensitivity is relatively low) until network congestion is sufficiently reduced to permit multicast and/or broadcast of the content without detriment to the utility of the content delivery, then the benefit is potentially less than regarding content for which a high volume value and a highly time sensitive value are determined.

In some embodiments, the four channelization factors are grouped together to form a single factor of multicast-ability, broadcast-ability, or both. This combined channelization factor, in one embodiment, is described in the unit of $$kUser \times \frac{MB}{\sec^2}.$$

If the value of this factor is greater than or equal to a certain threshold, the content is considered for multicast and/or broadcast. If the value of this factor is less than the certain threshold, the content is not considered for multicast and/or broadcast. It is contemplated that the threshold of the combined channelization factor may be different for determining multicast-ability and broadcast-ability. That is, content may be considered beneficial for multicast distribution, but not beneficial for broadcast distribution, or vice versa.

In some embodiments, the values of one or more of the four channelization factors are measured in real-time or near real-time, or are obtained from network nodes such as traffic probes (not illustrated) or other nodes typically used for network traffic management. In some embodiments, these values are obtained periodically at regular intervals, randomly, or via one-off measurements. Moreover, the multicast/broadcast-ability of content, in some embodiments, is re-calculated using the combined channelization factor based upon empirical data obtained from the network nodes, and channelization details updated accordingly.

Content that shares a common nature, subject, or other common criterion can then be grouped together to form a distribution channel. For example, a distribution channel may be formed for the top X number of videos on a particular video sharing site, such as YouTube™, or the top X number of videos Internet-wide. Other distribution channels may be formed for content grouped together based upon one or more common criterion.

Referring again to FIG. 6, the method 600 proceeds to block 606, whereat a localization process is performed. The localization process, in some embodiments, is optional. In embodiments that utilize the localization process, a plurality of content control systems, such as content controllers (e.g., configured like the content controller 128) and/or content controller servers (e.g., configured like the content controller server 130) are geographically dispersed in a coverage area of the communications network 100. These systems, in some embodiments, can conduct the optimization processes including the channelization process, the localization process, and the personalization process independent of one another to provide content to users in an area served by a given content control system. In alternative embodiments, the content control systems are in communication with one or more central content control systems that instruct the geographically dispersed systems to provide certain content to the area served by each system. In other embodiments, a single content control system, such as the content controller 128 or the content controller server 130 illustrated in FIG. 1, is used, although the precision of localization may be reduced.

The content control systems, in some embodiments, are distributed regionally, wherein a region is defined by the operator providing the broadcast and/or multicast service, or by a third party. Each regional content control system is configured to at least temporarily store and manage content of local interest to the region served by the regional content control system. Instead of fixing content placement a priori, in some embodiments, the aforementioned channelization factors are continuously monitored by the operator to facilitate optimization of content placement in the regionally distributed content control systems. For example, users in San Francisco, Calif. can form one local broadcast region and users in San Antonio, Tex. can form another local broadcast region. Other local broadcast regions can be similarly defined by the operator or, otherwise, based upon parameters or needs specified by the operator. For example, the operator may define local broadcast regions based upon broadcast traffic measurements in particular regions, subscriber density in particular regions, and the like.

Creation and deployment of new regional content control systems or, alternatively, merging of existing content control systems, in some embodiments, is decided, in part, by computing the differences in channelization across different regions, and then comparing the differences with a threshold value to determine whether it is considered cost-effective for the operator to create and deploy content control systems or demolish existing content control systems. The threshold value may be set based upon the cost of creating, deploying, and maintaining a content control system.

An additional benefit of the localization process is the ability to optimize video quality to a heterogeneous set of end user devices. For example, the video resolution achieved at the encoding stage of the content can be optimized based upon the type(s) of video decoder capabilities and screen resolution of the local set of users (viewers) in a given local broadcast region. Device information including, but not limited to, software (e.g., types and versions), firmware (e.g., versions), and hardware (e.g., 3GPP device category, screen size, input device, memory type, and memory capacity) specifications of a given end user device can be obtained by the content control system from a subscriber database (not illustrated herein), International Mobile Equipment Identity (IMEI) database (not illustrated herein), and/or other network node.

Turning now to block 608, a personalization process is performed. The personalization process, in some embodiments, is optional. The personalization process allows the network operator to use information such as the device information described above, subscriber information, subscriber behavior, and/or subscriber transaction history, and other types of personal content consumption profiles, to create a personal profile for a given user/subscriber. Subscriber information includes, but is not limited to, mobile subscriber identification number (MSISDN), account status (e.g., good, delinquent, or other), account type (e.g., personal or business), account features including subscription plan details (e.g., messaging—unlimited or specified limit, data—unlimited or specified limit, voice —unlimited or specified limit, broadcast subscriptions (e.g., MediaFlo™), and the like. Subscriber behavior includes, but is not limited to, frequently visited websites, website categories visited (e.g., news, sports, hobbies, shopping, entertainment, etc.), data usage in bytes or multiples thereof, video watching behavior (e.g., watching frequency, watching time pattern, type(s) of videos watched, etc.), and the like. Subscriber transaction history including, but not limited to, transaction information for transactions pertaining to Internet shopping, downloadable software (e.g., games, entertainment, utilities, social networking, music, productivity, lifestyle, reference, travel, sports, news, navigation, healthcare and fitness, photography, videography, finance, business, education, weather, books, medical, and the like), and multimedia (e.g., movies, television episodes, other video downloads, books, music tracks, ringtones, audio books, other audio downloads, and the like).

Transaction history also includes prices paid, urgency of watching in real-time or near real-time versus recorded time-delayed video.

In some embodiments, the creation of the personal profile is permitted via an opt-in procedure in which the subscriber must permit the network operator to use one or more of the aforementioned information types to create a personal profile for that subscriber for broadcast and/or multicast services. In some embodiments, the opt-in procedure offers multiple opt-in levels to provide users that desire personalization features a selection of how much information is permitted for use by the network operator in the personalization process. For example, a particular user may not want certain aspects of their usage, such as websites visited or transaction history, to be used by the network operator.

In some embodiments, the network operator recommends channel types and/or combinations of channels to subscribers. Based upon the reaction of the subscriber to such recommendations, the network operator can further optimize the placement and prioritization of content to content control systems which may be regionally distributed according to the localization process. The localization process, in some embodiments, is optimized based upon whether a particular subscriber or group of subscribers access one or more recommended channels.

Returning to FIG. 6, the method 600 proceeds to block 610, whereat the content control system outputs the content to a broadcast/multicast service center (e.g., the BM-SC/eBM-SC 124) and/or the other mobile broadcast systems 132. The method 600 may now end or loop back to another step for other content to be processed for optimization.

Figure 7:
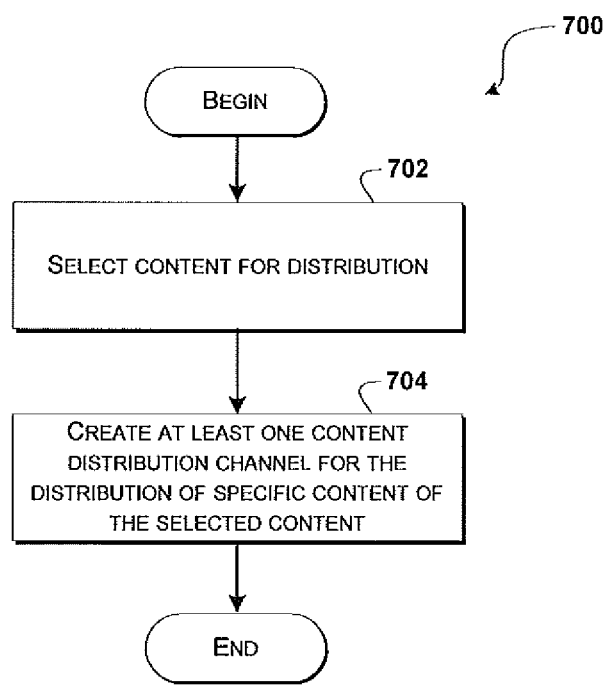
FIG. 7 illustrates an embodiment of the channelization process.

Referring now to FIG. 7, a channelization process 700 is illustrated. The channelization process 700 is a more detailed implementation of the channelization process described above with reference to block 604 of FIG. 6. The channelization process 700 begins and proceeds to block 702, whereat the content controller system 400, embodied as the content controller 128 and/or the content controller server 130 as described above, selects content received from one or more content providers for distribution via the communications network 100. At block 704, the content control system 400 creates at least one content distribution channel. Each of the content distribution channels are configured to distribute specific content of the selected content to one or more mobile communication devices via multicast or broadcast. The specific content is partitioned from the selected content based upon at least one criterion common to the specific content. For example, if the selected content is video content, the specific content of the selected video content may relate to a specific video category or type, such as sports, news, entertainment, or the like. The granularity of common criteria may extend further including specific types of a particular category or type. For example, sports videos may be further defined as football, baseball, soccer, hockey, basketball, and/or other sports games. The channelization process 700 can end after block 704.

Figure 8:
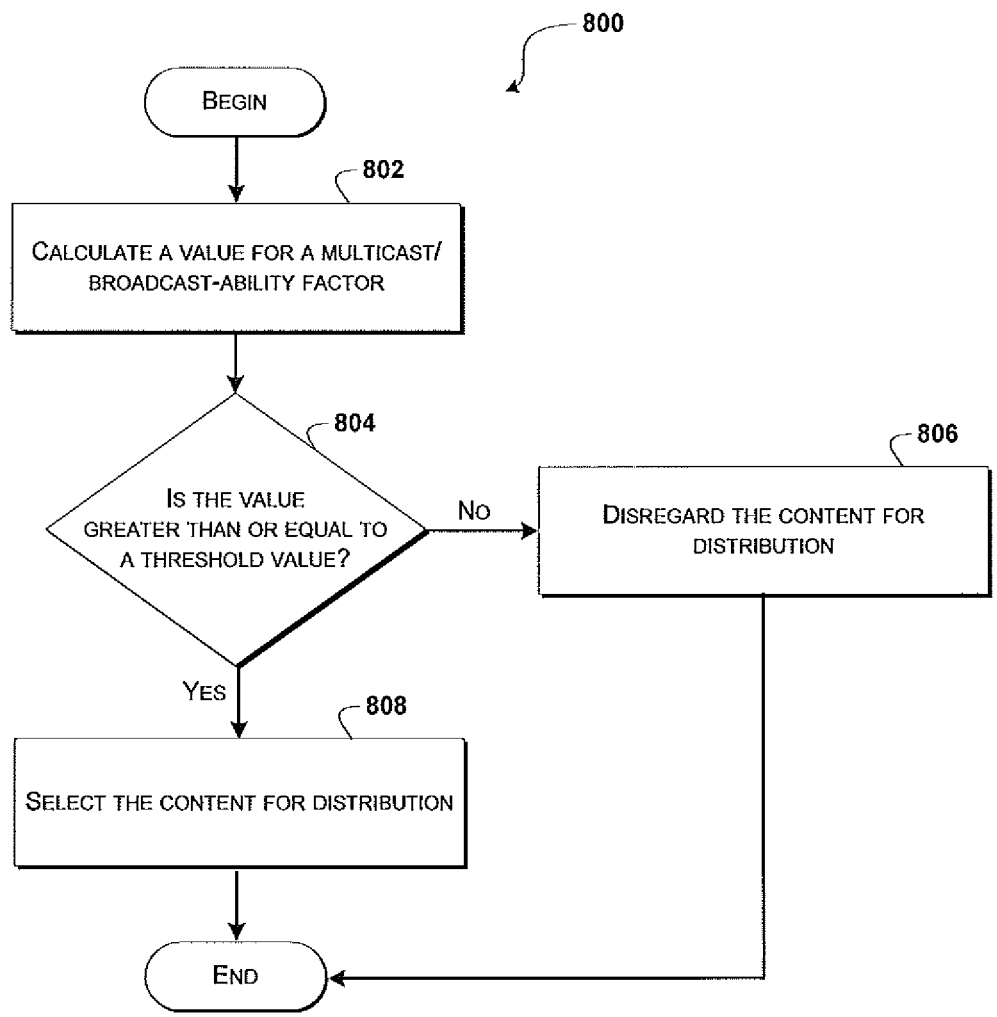
FIG. 8 illustrates an embodiment of a selection step of the channelization process of FIG. 7.

Referring now to FIG. 8, the selection step described above with reference to block 702 is now described in greater detail, according to one embodiment. The illustrated process 800 begins and proceeds to block 802, whereat the content control system 400 calculates a value for a multicast and/or broadcast-ability factor defined by one or more of a popularity factor, a volume factor, a time sensitivity factor, and a synchronism factor. In one embodiment the multicast and/or broadcast-ability factor is a combined factor consisting of all of the channelization factors. These factors are described above in greater detail.

At block 804, the content control system 400 determines whether the value calculated at block 802 is greater than or equal to a threshold value. If it is determined that the value is not greater than or equal to the threshold value, the process 800 proceeds to block 806, whereat the content control system 400 disregards the content for distribution after which the process 800 can end, If it is determined that the value is greater than or equal to the threshold value, the process 800 proceeds to block 808, whereat content control system 400 selects the content for distribution after which the process 800 can end. It is contemplated that the process 800 can repeat for any number of discrete pieces of content or groups of content.

Figure 9:
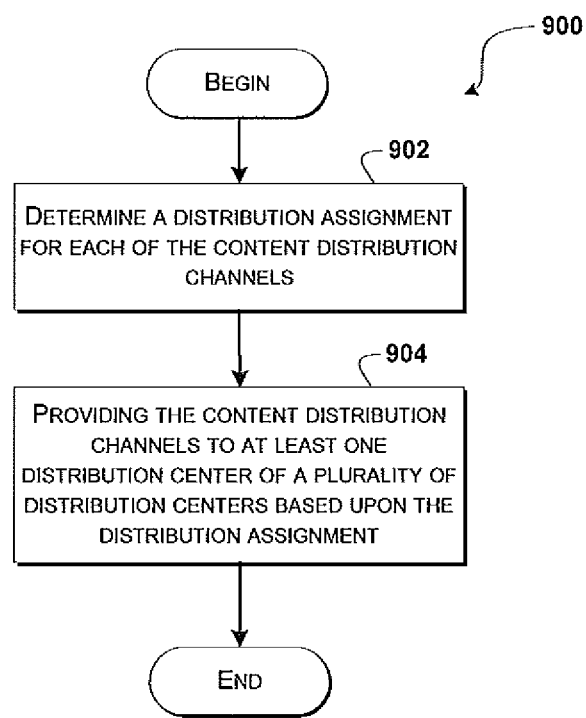
FIG. 9 illustrates an embodiment of the localization process.

Referring now to FIG. 9, an embodiment of a localization process 900 is illustrated. The localization process 900 begins and proceeds to block 902, whereat the content control system 400 determines a distribution assignment for each of the content distribution channels created during the channelization process 604, 700. In one embodiment, the distribution assignment is to one or more distribution centers including, for example, geographically dispersed content control systems in communication with the content control system 400, wherein the content control system 400 is a central content system. At block 904, the content control system 400 provides the content distribution channels to the distribution center(s) based upon the distribution assignment determined in block 902. The method 900 can end.

Figure 10:
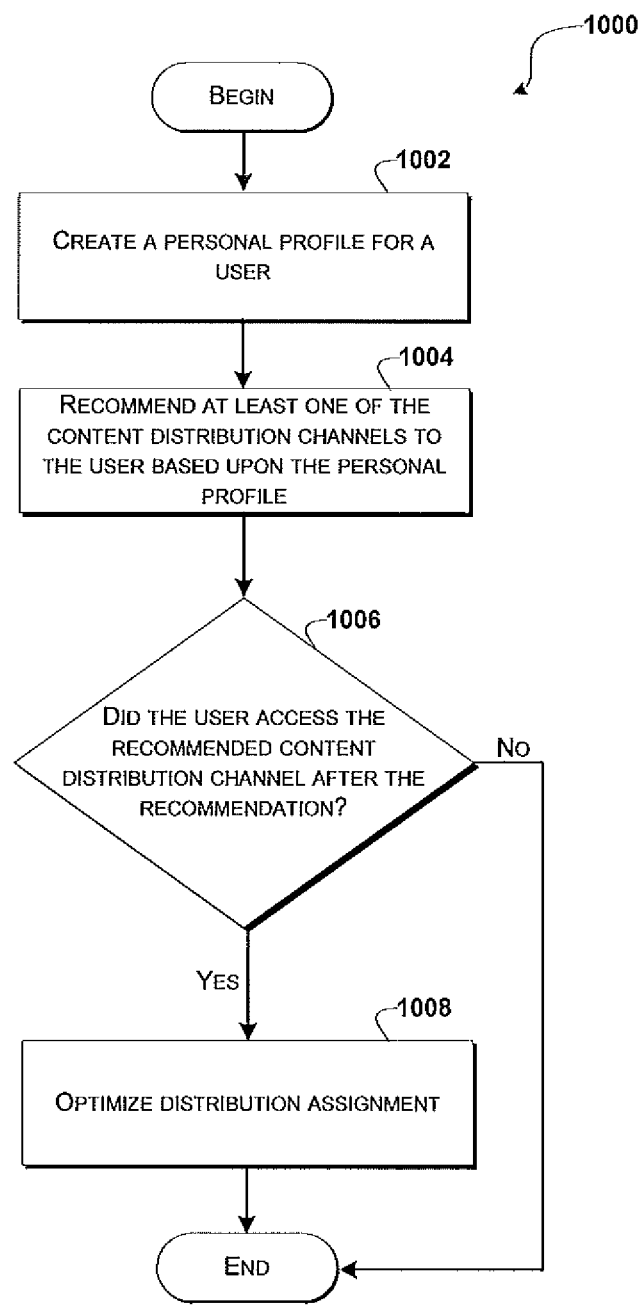
FIG. 10 illustrates an embodiment of the personalization process.

Referring now to FIG. 10, an embodiment of a personalization process 1000, (block 608 of FIG. 6) is illustrated. The personalization process 1000 begins and proceeds to block 1002, whereat the content control system 400 creates a personal profile for a user of the communications network 100. The personal profile may be based upon at least one of a watching time pattern, a price the user is willing pay for content, an urgency of watching the content in real-time, device information, subscriber information, subscriber behavior, and subscriber transaction history. At block 1004, the content control system 400 recommends at least one of the content distribution channels to the user based upon the personal profile created in block 1002. At block 1006, the content control system 400 determines whether the user accessed the recommended content distribution channel after the recommendation was made. If the user accessed the recommended content distribution channel after the recommendation, the process 1000 proceeds to block 1008, whereat the content control system 400 optimizes the distribution assignment. In one embodiment, the optimization includes optimizing placement of the content distributed via the recommended content distribution channel into a distribution center (e.g., a regional content control system) that serves the user. In some embodiments, the optimization only occurs after a certain number of times the user accesses a recommended channel or multiple recommended channels. The process 1000 can end.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A tangible computer-readable storage device comprising computer-executable instructions that, when executed by a processor, cause the processor to perform operations comprising:

selecting, for distribution via a wireless data network, content, the selecting comprising determining a value for a multicast/broadcast-ability factor incorporating each of:
- a popularity factor identifying a number of unique requests for the content over a time period;
- a volume factor identifying a number of bytes of the content;
- a time-sensitivity factor identifying a tolerable time delay for distribution of the content; and
- a synchronism factor identifying a variance among users in terms of when each of the users requests the selected content; and creating at least one content distribution channel, each channel being configured to distribute specific content, of the content selected, being partitioned from the content selected based upon a criterion common to the specific content for the channel.

2. The tangible computer-readable storage device of claim 1, wherein the operation of selecting the content further comprises:
determining whether the value for the multicast/broadcast-ability factor is greater than or equal to a threshold value;
wherein selecting the content for distribution via the wireless data network is contingent upon the value for the multicast/broadcast-ability factor being greater than or equal to the threshold value.

3. The tangible computer-readable storage device of claim 1, wherein the multicast/broadcast-ability factor is in a unit of kUsers*MB/sec$^2$, wherein kUsers represents a number of users, MB represents megabytes, and sec$^2$ represents seconds squared.

4. The tangible computer-readable storage device of claim 1, wherein the popularity factor, the volume factor, the time-sensitivity factor, and the synchronism factor are each determined based upon measurements collected from a network node of the wireless data network.

5. The tangible computer-readable storage device of claim 1, wherein the operations further comprise determining a distribution assignment for each of the content distribution channels, the distribution assignment assigning the content distribution channel to at least one of a plurality of distribution centers.

6. The tangible computer-readable storage device of claim 1, wherein the operations further comprise providing a user recommendation recommending at least one of the content distribution channels.

7. The tangible computer-readable storage device of claim 6, wherein the operations further comprise:
determining whether the user, following delivery of the user recommendation, accessed at least one of the content distribution channels of the user recommendation; and
optimizing distribution assignment of each of the content distribution channels to at least one of a plurality of distribution centers based upon results of the determining.

8. A method, for optimizing distribution of content via a wireless data network, comprising:
selecting, by a content controller using a processor, for distribution via the wireless data network, content, the selecting comprising determining a value for a multicast/broadcast-ability factor incorporating each of:
- a popularity factor identifying a number of unique requests for the content over a time period;
- a volume factor identifying a number of bytes of the content;
- a time-sensitivity factor identifying a tolerable time delay for distribution of the content; and
- a synchronism factor identifying a variance among users in terms of when each of the users requests the selected content; and creating, by the content controller, at least one content distribution channel, each channel being configured to distribute specific content, of the content selected, being partitioned from the content selected based upon a criterion common to the specific content for the channel.

9. The method of claim 8, further comprising:
determining, by the content controller, whether the value for the multicast/broadcast-ability factor is greater than or equal to a threshold value;
wherein selecting the content is contingent upon the value for the multicast/broadcast-ability factor being greater than or equal to the threshold value.

10. The method of claim 8, wherein the multicast/broadcast-ability factor is in a unit of kUsers*MB/sec$^2$, wherein kUsers represents a number of users, MB represents megabytes, and sec$^2$ represents seconds squared.

11. The method of claim 8, wherein the popularity factor, the volume factor, the time sensitivity factor, and the synchronism factor are each determined based upon measurements collected from a network node of the wireless data network.

12. The method of claim 8, further comprising determining, by the content controller, a distribution assignment for each of the content distribution channels, the distribution assignment assigning the content distribution channel to distribution center.

13. The method of claim 8, further comprising creating a personal profile for a user of the wireless data network based upon a piece of data selected from a group consisting of: subscriber information; subscriber behavior; and subscriber transaction history.

14. The method of claim 8, further comprising providing a user recommendation of at least one of the content distribution channels.

15. The method of claim 14, further comprising:
determining whether the user accessed, following the user recommendation, at least one of the content distribution channels of the user recommendation; and
optimizing distribution assignment of each of the content distribution channels to at least one of a plurality of distribution centers based upon results of the determining.

16. A content controller, comprising:
a processor;
a memory comprising computer-executable instructions that, when executed by the processor, cause the processor to perform operations comprising:
selecting, for distribution via a wireless data network, content;
wherein selecting the content comprises determining a value for a multicast/broadcast-ability factor incorporating each of:
- a popularity factor identifying a number of unique requests for the content over a time period;
- a volume factor identifying a number of bytes of the content;
- a time sensitivity factor identifying a tolerable time delay for distribution of the content; and
- a synchronism factor identifying a variance among users in terms of when each of the users requests the content; and wherein selecting the content is contingent upon the value for the multicast/broadcast-ability factor being greater than or equal to a threshold value.

17. The content controller of claim 16, wherein the content controller is a device selected from a group consisting of:

a server configured to receive the content from at least one content provider and provide the content via the content distribution channels to at least one entity selected from a group consisting of a multimedia-broadcast-and-multicast-service service center, an electronic multimedia-broadcast-and-multicast-service service center, a combined multimedia-broadcast-and-multicast-service service center/electronic multimedia-broadcast-and-multicast-service service center, a broadcast-and-multicast-service service center, a mobile-broadcast-service operator, a digital video broadcasting-handheld system, and a worldwide-interoperability-for-microwave-access multicast/broadcast system;

a component of a center selected from a group consisting of a multimedia-broadcast-and-multicast-service service center, an electronic multimedia-broadcast-and-multicast-service service center, and a broadcast-and-multicast-service service center; and a multimedia-broadcast-and-multicast-service service center, an electronic multimedia-broadcast-and-multicast-service service center, and a broadcast-and-multicast-service service center.

18. The content controller of claim 16, wherein the operations further comprise creating at least one content distribution channel, each channel being configured to distribute specific content, of the content selected, being partitioned from the content selected based upon a criterion common to the specific content for the channel.

* * * * *